No. 890,001. PATENTED JUNE 9, 1908.
H. D. WILLIAMS & M. LEONARD.
ELECTRIC SAFETY AND ALARM SYSTEM FOR RAILROADS.
APPLICATION FILED APR. 19, 1907.

2 SHEETS—SHEET 1.

No. 890,001. PATENTED JUNE 9, 1908.
H. D. WILLIAMS & M. LEONARD.
ELECTRIC SAFETY AND ALARM SYSTEM FOR RAILROADS.
APPLICATION FILED APR. 18, 1907.

2 SHEETS—SHEET 2.

UNITED STATES PATENT OFFICE.

HERBERT D. WILLIAMS AND MARCUS LEONARD, OF VERMILLION, KANSAS; SAID LEONARD ASSIGNOR TO SAID WILLIAMS.

ELECTRIC SAFETY AND ALARM SYSTEM FOR RAILROADS.

No. 890,001.  Specification of Letters Patent.  Patented June 9, 1908.

Application filed April 18, 1907. Serial No. 368,969.

*To all whom it may concern:*

Be it known that we, HERBERT D. WILLIAMS and MARCUS LEONARD, citizens of the United States, residing at Vermillion, in the county of Marshall and State of Kansas, have invented certain new and useful Improvements in Electric Safety and Alarm Systems for Railroads, of which the following is a specification, reference being had therein to the accompanying drawing.

Our invention relates to electric safety and alarm systems for railroads.

The object of the invention is to provide a system which will be easily and inexpensively installed, which will entail a small cost for maintenance, and which will be thoroughly efficient in operation, so that collisions, whether head on or rear end, will be positively avoided.

A further object of the invention is to eliminate the use of automatic pole changing devices heretofore used in systems of this character where separate batteries were carried upon the vehicles traveling on the line. In systems of this kind unless the batteries are of relatively different strengths, they neutralize each other to such an extent that the operation of either one is doubtful. Where automatic pole changing devices are employed, accidents sometimes result from their failure to properly operate to place the batteries in series with their unlike poles together so that the combined strength of both will be sufficient to operate the air or other emergency braking devices.

Our invention is designed to obviate all difficulties and broadly speaking consists in providing a battery or batteries located at different points along the route which will operate in combination with alarming devices and electrically controlled braking devices to give an alarm to the engineer and to automatically cut off the steam or allow the escape of the air so that the emergency brakes may be applied. Provision is also made whereby in case of a runaway train or the failure of the engineer to see a danger signal, the station master or any other authorized person at a given point may throw a switch to complete the circuit of the alarm and the electrically controlled braking device so as to stop the train.

Our invention is illustrated in the accompanying drawings wherein

Figure 1:
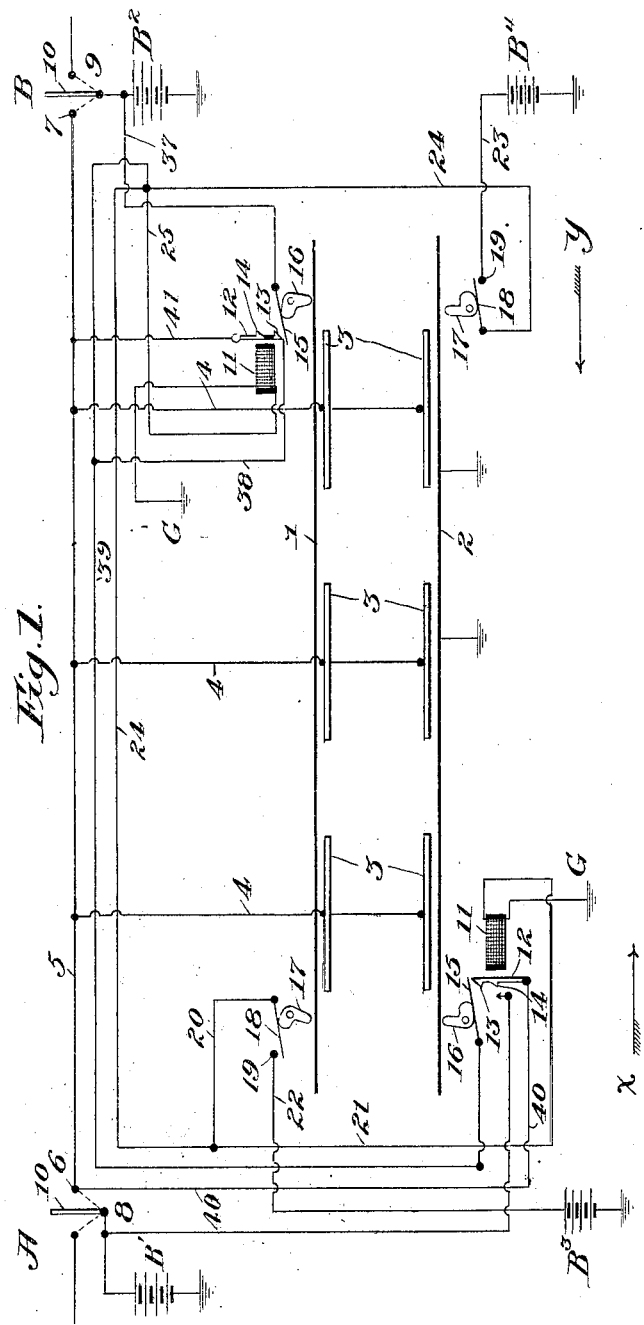
Figure 2:
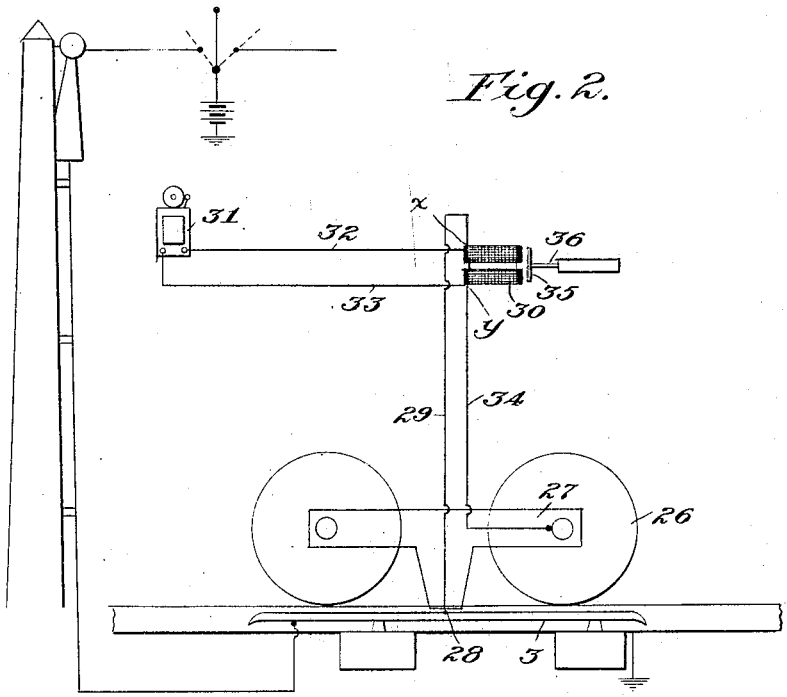

Figure 1 is a diagrammatic view showing the two stations with tracks between and a connecting rail having taps carried off to brush rails. Fig. 2 is a diagrammatic view of the cab connections and circuits.

Referring now to Fig. 1, 1 and 2 represent the track rails which extend between the stations A and B, this length of track being described herein as a single block, it being understood that the block might be of any length desired. Between the stations and preferably between the tracks are located a plurality of brush contact rails 3 having leads 4 led off therefrom to a common line wire 5 extending between the stations and terminating at contact points 6 and 7 of switches 8 and 9 respectively at stations A and B. At each station, A and B, the levers 10 of the switches 8 and 9 are connected directly with batteries B', B², so that if the levers are thrown upon the contact points 6 and 7, current may be thereby thrown upon the line 5 and to all of the brush contact rails 3 in parallel. If there is no car on the track, however, the circuit is not completed and there is no current flowing over the line, but when the brush of a car engages one of the brush contact rails, a circuit through its operating device and alarm is completed, as will be hereinafter described. At each station A and B there is provided a magnet 11 which has one side of its winding grounded at G and which controls an armature 12 provided with projecting lugs or lips 13 and 14 adapted to hold the contact arm 15 in depressed position until the magnet is energized. The armature 12 at station A is electrically continuous throughout its length to its pivot point or to its connection with wire 40, but the armature 12 at station B is separated by a dielectric so that the wires 38 and 41 which are connected with different parts thereof are electrically separate. Pivotally secured adjacent the track and the arm 15 at each end of the block is a trip lever 16 which is provided with a cam face bearing against the arm 15. A contact arm carried by the car engages the upper end of the trip lever carrying it over so as to depress the arm 15 and force it under the first lug or lip 13 where it remains until the magnet is energized and the arm 15 is released. On the opposite side of the track is a similar trip lever 17 controlling the contact arm 18, which is normally held away from the contact 19 but which is adapted to operate in the same manner as the trip lever 16 to close the contact arm 18 against the contact 19 and complete a circuit over the wires 20 and 21 to the magnet 11 and ground, from battery B³ at station A or B⁴ at station B over wires 23, 24, 25, magnet 11 and ground at G.

In Fig. 2 we have shown the wheels of a cab grounded upon the rails, and designated by the numerals 26. Carried by the truck 27 is a contact brush 28 which is adapted to engage the brush contact rails 3 as the car passes along. Connected to the contact brush 28 is a wire 29 which is in turn connected to a magnet 30, and in parallel to the bell 31 by a wire 32. The opposite side of the bell is connected by wire 33 to the opposite side of the magnet 30. A circuit is completed to one of the wheels 26 and the ground by wire 34 leading from the opposite side of the magnet to which the wire 29 is connected. The armature 35 of the magnet 30 is connected by a rod 36 to a valve controlling the air of the brakes, or to any sort of braking devices, the constructions of which are not material to the working of this invention and are therefore not illustrated.

The operation of the system so far as thus described is as follows: When a train approaches in the direction of the arrow X, its contact arm engages the tripping lever 16 and throws the contact arm 15 into engagement with the latching armature 12. At this time no current passes into the line 5. But should a train approach in the opposite direction or in the direction of the arrow Y, its contact arm would engage the tripping lever 16 at the station B or at that entrance to the block, and throw the contact 15 into engagement with the latching armature. This completes a circuit from battery B² as follows: 37, 15, 38, 39, contact arm 15 at station A, 40, wire 5 and to all of the contact brush rails 3. The train coming in the direction of the arrow X will have its circuit completed from the contact brush rail 3, wire 29, magnet 30, wire 34, wheel 26, rail 1, ground and back to battery. From the point x, the point of connection of the wire 29 and the winding of the magnet 30, a parallel path through the bell 31 is made over wires 32 and 33 back to the point of connection y. The result is that the magnet 30 is operated to attract its armature and operate through the rod 36 the air valve or the brake mechanism and at the same time the bell 31 notifies the engineer that there is a train approaching him on the same block. He may then switch in a telephone by removing the receiver from the hook and talk with the engineer of the train approaching in the opposite direction. As the circuits of all trains are similar, it is unnecessary to state that the train approaching in the direction of the arrow Y is stopped in the same manner as the train approaching from the opposite direction. If however there is no train upon the block, no current will flow on the line and the operation of the tripping lever 16 will not affect the free running of the train through the block. When it approaches the opposite end of the block, the tripping lever 17 throws the contact arm 18 into engagement with the contact 19 and completes the following circuit: (if the tripping lever is at station B) battery B⁴, wire 23, contact 19, contact arm 18, 24, 21 magnet 11 and ground. This magnet thereupon draws up its latching armature, thus releasing the contact arm 15 which is returned to its normal position in any suitable manner. The operation just described, that of releasing the tripping magnet 11, is the same at all stations. If a runaway train passes either station or if the engineer should disregard a danger signal thereat, the station master can throw the switch lever 10 into contact with either the contact points 6 or 7 and thus throw current from either battery B' or B³ over the line wire 5 and thus through the leads 4 to all of the contact strips 3.

Although we have shown the most simple form in which to accomplish a certain object, we do not wish to be limited in any way thereto, as many changes and modifications might be made without departing from the scope of the invention, and all such changes and modifications are contemplated by us and are considered within the purview of the appended claims.

Having thus described our invention what we claim and desire to secure by Letters Patent is

1. An electric safety system comprising block sections, vehicles traveling thereover, electromagnetic braking and alarming means thereon, means for automatically partially completing the circuit of said electromagnetic braking and alarming means on a vehicle when entering a block, and means becoming operative on the entrance of another vehicle in the block to fully complete the circuits of the electromagnetic braking and alarming means for both vehicles.

2. In an electric safety system for railroads, the combination with grounded track rails divided into block sections, of contact strips located adjacent said rails, electromagnetic braking and alarming means carried by the vehicles traveling over said rails, means for partially completing a circuit of the electromagnetic braking and alarming means of the vehicle first entering the block, means for fully completing the circuits of the electromagnetic braking and alarming means upon the entrance of second train into the block, and means becoming operative upon the exit of either train from the block to break the circuits.

3. In an electrical safety system, the combination with grounded track rails divided into blocks, of contact strips located adjacent thereto, electromagnetic braking and alarming means carried by vehicles adapted to travel over said rails, contact brushes adapted to engage said contact strips and carried by the vehicles, means operated by the vehicle first entering the block for partially closing the circuit of its electromagnetic braking and alarming means, and means operated upon the exit of said vehicle from the block to restore said circuit completing means to normal.

4. In an electric safety system, the combination with grounded track rails divided into blocks, of electromagnetic braking and alarming means carried by vehicles adapted to travel over said rails, circuit connections for said electromagnetic braking and alarming means, means operated in the travel of a vehicle to partially complete the circuits for said electromagnetic braking and alarming means, and a tripping lever for completing the circuit of said electromagnetic braking and alarming means which is operated as the vehicle leaves the block.

5. In an electric safety system, the combination with grounded track rails divided into blocks electromagnetic braking and alarming means carried by vehicles traveling over said rails, circuit connections for said electromagnetic braking and alarming means, a tripping lever operated by the vehicle for partially completing the circuits thereof upon the entrance of said vehicle into the block, a tripping lever operated by the entrance of a second vehicle into the block for fully completing the circuits of the electromagnetic braking and alarming means on both vehicles, electromagnetic releasing means for said circuit completing means, and means controlled by the exit of the vehicle from the block for operating said electromagnetic releasing means.

6. In an electric safety system, the combination with track rails divided into blocks, of tripping levers at either end of the blocks controlled by the vehicles moving over said rails, circuits controlled by said tripping levers and disconnecting means for said circuits controlled by one of said tripping levers.

7. In an electric safety system, the combination with track rails divided into block sections, of a pair of tripping levers one at each end of the block, vehicles traveling over said rails having means for operating said tripping levers, means controlled by said tripping levers for closing electric circuits, another pair of tripping levers one at each end of the block, means controlled by the last-mentioned tripping levers, and electromagnetic controlling and alarming means carried by the vehicles and governed by the making and breaking of the above mentioned circuits and the position of the vehicles upon the blocks.

8. In an electric safety system, the combination with a pair of track rails divided into block sections, of a line extending the length of the block, contact strips located adjacent the rails and having electric connection with the line, a circuit controlling device for completing the circuit to said contact strips, said circuit controlling device operated by a vehicle entering the block, another circuit controlling device operated by a vehicle entering the block in the opposite direction, said last named circuit controlling device acting to fully complete the circuits to the contact strips, electromagnetic braking and controlling means on the vehicles, circuit connections therefor, and a contact brush forming part of the circuit connections and adapted to engage the contact strips.

9. In an electric safety system, the combination with a pair of track rails divided into block sections, of a line extending the length of the block, contact strips located adjacent the rails and having electric connection with the line, a circuit controlling device for completing the circuit to said contact strips, said circuit controlling device operated by a vehicle entering the block, another circuit controlling device operated by a vehicle entering the block in the opposite direction, said circuit controlling device acting to fully complete the circuits to the contact strips, electromagnetic braking and alarming means on the vehicles, circuit connections therefor, a contact brush forming part of the circuit connections and adapted to engage the contact strips, a pair of tripping levers one at each end of the block and controlled by the vehicle in its exit therefrom, and means controlled by said tripping levers for releasing the circuit completing means of the electromagnetic and alarming means.

In testimony whereof we affix our signatures in presence of two witnesses.

HERBERT D. WILLIAMS.
MARCUS LEONARD.

Witnesses:
DAVID QUAKENBUSH,
JACOB M. MURRAY.